United States Patent
Amiri et al.

(10) Patent No.: US 8,040,981 B2
(45) Date of Patent: Oct. 18, 2011

(54) SYMBOL DETECTION IN A MIMO COMMUNICATION SYSTEM

(75) Inventors: Kiarash Amiri, Houston, TX (US);
Christopher H. Dick, San Jose, CA (US); Raghavendar Mysore Rao, Austin, TX (US); Joseph R. Cavallaro, Pearland, TX (US)

(73) Assignee: XILINX, Inc., San Jose, CA (US)

( * ) Notice: Subject to any disclaimer, the term of this patent is extended or adjusted under 35 U.S.C. 154(b) by 659 days.

(21) Appl. No.: 12/170,468

(22) Filed: Jul. 10, 2008

(65) Prior Publication Data
US 2010/0008451 A1    Jan. 14, 2010

(51) Int. Cl.
*H04L 27/06* (2006.01)
(52) U.S. Cl. .................. 375/340; 375/267; 375/347
(58) Field of Classification Search .......... 375/259–260, 375/267, 299, 316, 340, 347, 349
See application file for complete search history.

(56) References Cited

U.S. PATENT DOCUMENTS

| | | | |
|---|---|---|---|
| 7,245,666 B1 | 7/2007 | Gardner et al. | |
| 7,529,307 B2 | 5/2009 | Sandhu et al. | |
| 7,720,169 B2 * | 5/2010 | Reuven et al. | 375/267 |
| 2006/0148506 A1 | 7/2006 | Hoo | |
| 2006/0171483 A1 | 8/2006 | Jia et al. | |
| 2007/0162827 A1 | 7/2007 | Walton et al. | |
| 2008/0089446 A1 | 4/2008 | Lee et al. | |
| 2008/0095281 A1 * | 4/2008 | Hosur et al. | 375/347 |
| 2008/0107196 A1 | 5/2008 | Won | |
| 2008/0144746 A1 | 6/2008 | Waters et al. | |
| 2008/0279298 A1 * | 11/2008 | Ben-Yishai et al. | 375/261 |
| 2008/0279299 A1 | 11/2008 | Reuven et al. | |
| 2009/0003499 A1 | 1/2009 | Chiu et al. | |
| 2009/0060079 A1 * | 3/2009 | Choi et al. | 375/265 |
| 2009/0154600 A1 * | 6/2009 | Kim et al. | 375/320 |
| 2009/0196379 A1 | 8/2009 | Gan et al. | |

FOREIGN PATENT DOCUMENTS
WO    WO 2008/027554 A3    3/2008

OTHER PUBLICATIONS

Chin, W. H., "QRD Based Tree Search Data Detection for MIMO Communication System," *Proc. of the IEEE 61st Semiannual Vehicular Technology Conference*, May 30-Jun. 1, 2005, pp. 1624-1627, vol. 3, Stockholm, Sweden.

(Continued)

*Primary Examiner* — Jean B Corrielus
(74) *Attorney, Agent, or Firm* — LeRoy D. Maunu (57) ABSTRACT

Circuits are provided for detecting symbols transmitted from multiple transmitting antennas to multiple receiving antennas. A circuit includes distance blocks, selectors, and an identifier block. Each distance-block includes at least one sub-block, and each sub-block inputs a candidate for a corresponding transmitting antenna. The sub-block determines partial distances for pairings of the candidate and each symbol in a constellation from a partial distance of the candidate and signals received at the receiving antennas. At least one selector assigns each pairing for each candidate for a corresponding transmitting antenna to a bin having a range that includes the partial distance of the pairing. The selector selects candidates for a successive transmitting antenna from the bins having the smaller ranges. The identifier block selects a final candidate that is one of the pairings for a last transmitting antenna having a smaller partial distance.

19 Claims, 6 Drawing Sheets

OTHER PUBLICATIONS

Detert, Thorben, "An Efficient Fixed Complexity QRD-M Algorithm for MIMO-OFDM using Per-Survivor Slicing," *Proc. of the 4th IEEE Int'l. Symposium on Wireless Communication Systems*, Oct. 16-19, 2007, pp. 572-576, Trondheim, Norway.

Amiri, Kiarash et al., "Novel Sort-Free Detector with Modified Real-Valued Decomposition (M-RVD) Ordering in MIMO Systems," *Proc. of the 2008 IEEE Global Telecommunications Conference*, Nov. 30, 2008, pp. 1-5, Piscataway, New Jersey, USA.

Azzam, Luay et al., "Reduced Complexity Sphere Decoding for Square QAM via a New Lattice Representation," *Proc. of the 2007 IEEE Global Telecommunications Conference*, Nov. 1, 2007, pp. 4242-4246, Piscataway, New Jersey, USA.

Azzam, Luay et al., "Reduction of ML Decoding Complexity for MIMO Sphere Decoding, QOSTBC, and OSTBC," *Proc. of the 2008 Information Theory and Applications Workshop*, Jan. 27, 2008, pp. 18-25, Piscataway, New Jersey, USA.

Chen, Sizhong et al., "Relaxed K-Best MIMO Signal Detector Design and VLSI Implementation," *IEEE Transactions on Very Large Scale Integration(VLSI) Systems*, Mar. 2007, pp. 328-337, vol. 15, No. 3.

Kawai, Hiroyuki et al., "Independent Adaptive Control of Surviving Symbol Replica Candidates at Each Stage Based on Minimum Branch Metric in QRM-MLD for OFCDM MIMO Multiplexing," *Proc. of the 2004 IEEE 60th Vehicular Technology Conference*, Sep. 26, 2004, pp. 1558-1564, vol. 3, Piscataway, New Jersey, USA.

Lin, Hsin-Lei et al., "A High-Speed SDM-MIMO Decoder Using Efficient Candidate Searching for Wireless Communication," *IEEE Transactions on Circuits and Systems—II: Express Briefs*, Mar. 2008, pp. 289-293, vol. 55, No. 3.

Mondal, Sudip, "A Novel Approach for K-Best MIMO Detection and its VLSI Implementation," *Proc. of the 2008 IEEE International Symposium on Circuits and Systems*, May 18, 2008, pp. 936-939, Piscataway, New Jersey, USA.

Myllylä, Markus et al., "Implementation Aspects of List Sphere Detector Algorithms," *Proc. of the 2007 IEEE Global Telecommunications Conference*, Nov. 1, 2007, pp. 3915-3920, Piscataway, New Jersey, USA.

Myllylä, Markus et al., "A List Sphere Detector Based on Dijkstra's Algorithm for MIMO-OFDM Systems," *Proc. of the 2007 IEEE 18th Annual Symposium on Personal, Indoor and Mobile Radio Communications*, Sep. 1, 2007, pp. 1-5, Piscataway, New Jersey, USA.

Wu, Yi Hsuan, "Early-Pruned K-Best Sphere Decoding Algorithm Based on Radius Constraints," *Proc. of the 2008 IEEE International Conference on Communications*, May 19, 2008, pp. 4496-4500, Piscataway, New Jersey, USA.

Huang, Liang et al.; "Better k-best Parsing"; Proceedings of the Ninth International Workshop on Parsing Technologies (IWPT); Oct. 2005; Copyright 2005 Association for Computational Linguistic; pp. 53-64.

Guo, Zhan et al.; "A Low Complexity Soft-Output MIMO Decoding Algorithm"; Advances in Wired and Wireless Communication; IEEE/Sarnoff Symposium; 2005 IEEE; pp. 90-93.

Wong, Kwan-wei et al.; "A VLSI Architecture of a K-Best Lattice Decoding Algorithm for MIMO Channels"; Circuits and Systems; 2002; ISCA 2002; IEEE International Symposium; Copyright 2002 IEEE; pp. III-273-III-276.

Damen, Mohamed Oussama et al.; "On Maximum-Likelihood Detection and the Search for the closest Lattice Point"; IEEE Transactions on Information Theory; vol. 49, No. 10; Oct. 2003; pp. 2389-2402.

Burg, Andreas et al.; "VLSI Implementation of MIMO Detection Using the Sphere Decoding Algorithm"; IEEE Journal of Solid-State Circuits; vol. 40, No. 7; Jul. 2005; Copyright 2005 IEEE; pp. 1566-1577.

Amiri, Kiarash et al.; "FPGA Implementation of Dynamic Threshold Sphere Detection for MIMO Systems"; 40th Asilomar Conference on Signals, Systems, and Computers; Nov. 2006; pp. 94-98.

Guo, Zhan et al.; A 53.3 Mb/s 4X4 16-QAM MIMO Decoder in 0.35-μm CMOS; IEEE International Symposium on Circuits and Systems; vol. 5; Copyright 2005 IEEE; May 2005; pp. 4947-4950.

Bengough, Peter A. et al.; "Sorting-Based VLSI Architectures for the M-Algorithm and T-Algorithm Trellis Decoders"; Copyright 1995 IEEE; IEEE Transactions on Communications, vol. 43, No. 2/3/4, Feb. / Mar. / Apr. 1995; pp. 514-522.

Xilinx, Inc.; U.S. Appl. No. 12/025,971; by Kiarash Amiri et al.; filed Feb. 5, 2008.

Xilinx, Inc.; U.S. Appl. No. 12/045,786; by Kiarash Amiri et al.; filed Mar. 11, 2008.

Xilinx, Inc.; U.S. Appl. No. 12/170,474; by Kiarash Amiri et al.; filed Jul. 10, 2008.

Xilinx, Inc.; U.S. Appl. No. 12/193,106; by Christopher H. Dick et al.; filed Aug. 18, 2008.

* cited by examiner

FIG. 6

SYMBOL DETECTION IN A MIMO COMMUNICATION SYSTEM

FIELD OF THE INVENTION

The present invention generally relates to communication to multiple input antennas from multiple output (MIMO) antennas, and more particularly to symbol detection for a MIMO communication system.

BACKGROUND

Data can be transmitted electromagnetically between a transmitting and a receiving antenna. The transmitter encodes the data into a sequence of symbols selected from a symbol constellation. The transmitting antenna transmits the symbols and the receiving antenna detects the symbols.

Interference from noise and reflections corrupts the symbols received by the receiving antenna. For a maximum-likelihood detector, the receiver can compare the received signal with the expected received signal for all of the symbols in the constellation. The expected received signal that most closely matches the actually received signal provides the detected symbol.

A measurement of the characteristics of the communication medium helps proper symbol detection. In one example, the transmitter periodically transmits a known pattern of symbols to the receiver and the receiver uses the known pattern to determine the characteristics, such as multiple signal propagation paths, of the communication medium.

The data transfer rate of electromagnetic communication increases by transmitting multiple symbols in parallel from multiple transmitting antennas. The detection of the multiple transmitted symbols improves by receiving the symbols with multiple receiving antennas.

For maximum-likelihood detection with multiple transmitting antennas, the number of possible combinations of symbols transmitted in parallel is the degree of the constellation raised to the power of the number of transmitting antennas. Evaluation of all possible combinations is infeasible for higher order modulations and a large number of antennas.

The present invention may address one or more of the above issues.

SUMMARY

Various embodiments of the invention provide a circuit for detecting symbols transmitted from multiple transmitting antennas to multiple receiving antennas. The transmitting antennas have an ordering that begins with an initial transmitting antenna and ends with a last transmitting antenna. The circuit includes respective distance-blocks corresponding to the transmitting antennas, respective selectors corresponding to combinations of a first and successive second transmitting antenna in the ordering, and an identifier block corresponding to the last transmitting antenna in the ordering. Each distance-block includes at least one sub-block, and each sub-block inputs a candidate for the corresponding transmitting antenna. The sub-block determines partial distances of pairings of the candidate and each symbol in a constellation. The sub-block determines the partial distance of each pairing from a partial distance of the candidate and signals received at the receiving antennas. The respective selector corresponding to each combination is coupled between the respective distance-blocks corresponding to the first and successive second transmitting antennas of the combination.

The respective selector corresponding to one or more of the combinations uses bins having respective ranges. The respective selector assigns each pairing for each candidate for the first transmitting antenna to the bin having the respective range that includes the partial distance of the pairing. The respective selector selects each candidate for the successive second transmitting antenna as a pairing from the bins having the smaller respective ranges. The identifier block is coupled to the respective distance-block corresponding to the last transmitting antenna for receiving the pairings for each candidate for the last transmitting antenna. The identifier block selects a final candidate that is one of the pairings having the smaller partial distance.

Another embodiment of the invention provides a system for detecting symbols communicated between multiple transmitting antennas and multiple receiving antennas. An ordering of the transmitting antennas ends with a last transmitting antenna. The system includes a means for generating respective ranges for a plurality of bins in response to a signal-to-noise ratio of a plurality of signals received at the receiving antennas. For each transmitting antenna, the system includes means for determining partial distances of a plurality of pairings of a candidate for the transmitting antenna and one of a plurality of symbols in a constellation. The partial distances are determined from a partial distance of the candidate and the signals received at the receiving antennas. For each of a plurality of combinations of a first and successive second transmitting antenna in the ordering, the system includes means for assigning each pairing for each candidate for the first transmitting antenna to the bin having the respective range that includes the partial distance of the pairing, and means for selecting each candidate for the successive second transmitting antenna as a pairing from the bins having the smaller respective ranges. The system also includes a means for selecting a final candidate that is one of the pairings for the last transmitting antenna. The final candidate is the one of the pairings having the smaller partial distance.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
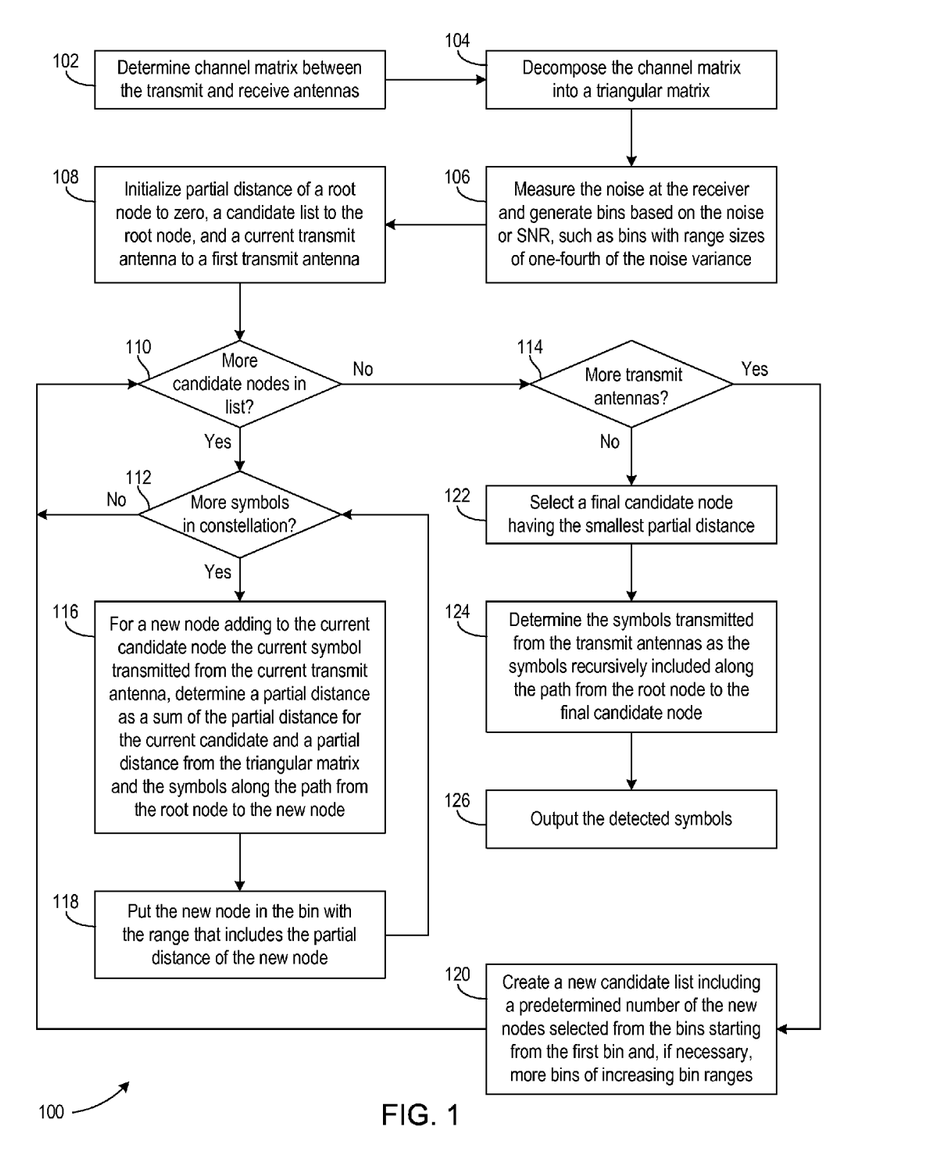
FIG. 1 is a flow diagram of a process for detecting symbols received at multiple input antennas and transmitted from multiple output antennas in accordance with various embodiments of the invention.

FIG. 1 is a flow diagram of a process 100 for detecting symbols received at multiple input antennas and transmitted from multiple output antennas in accordance with various embodiments of the invention. While a maximum-likelihood detector detects the transmitted symbols by considering all combinations of each transmitting antenna transmitting every possible symbol in a constellation, process 100 considers a subset of all of these combinations. Process 100 maps the considered combinations into a series of bins, with each bin corresponding to a range of likelihoods that the transmitting antennas actually transmitted the considered combinations in the bin.

At step 102, a channel matrix is determined for the communication channel between the transmitting and receiving antennas. A model for the communication channel is:

$$y = Hs + n$$

where H is an N×M channel matrix between the N receiving antennas and the M transmitting antennas, s is a column vector of M symbols transmitted from the transmitting antennas, n is a column vector of N received noise elements, and y is a column vector of N signals received at the receiving antennas. Each of the M transmitted symbols in column vector s is a symbol from a constellation having an order of w symbols.

At step 104, process 100 decomposes the channel matrix into a triangular matrix. In one embodiment, the triangular matrix is an upper triangular matrix from a QR decomposition of the channel matrix. The detection of the transmitted symbols includes determining the M symbols in column vector s that minimize the distance norm:

$$D(s) = \|y - Hs\|^2 = \|Q^H y - Rs\|^2 = \sum_{i=M}^{1} \left| y'_i - \sum_{j=i}^{M} R_{ij} s_j \right|^2$$

where H=QR, $QQ^H=I$, and $y'=Q^H y$. The summations derive from R being an upper triangular matrix. The outer summation from i=M down to 1 is a summation of a corresponding term for each of the transmitting antennas beginning from the last antenna. The corresponding term of the outer summation for each transmitting antenna is denoted the partial distance for the transmitting antenna. The partial distance for a particular transmitting antenna with index i includes an inner summation of a weighting of the candidate symbols from transmitting antennas i to M. Thus, the QR decomposition permits calculating the distance norm D(s) for candidate symbols s by summing a partial distance for each index of a transmitting antenna, and the partial distance for each index is a function of the symbols having the same and larger indices.

The receiver detects the transmitted symbols by computing the distance norm for certain combinations selected from all combinations of M symbols in the constellation. The M symbols actually transmitted from the M transmitting antennas should match the combination that has the smallest value of the distance norm.

At step 106, the receiver measures the noise in the signals received at the receiving antennas. In one embodiment, the receiver measures a magnitude of the noise in the received signal. In another embodiment, the receiver measures the signal-to-noise ratio (SNR) between the received signal and the noise included with the received signal. Bins are generated based on the noise or the SNR.

In one example, the received noise is assumed to be predominately Gaussian noise following a normal distribution. The normal distribution can be broken into a sequence of noise ranges over a few standard deviations of the normal distribution. In one embodiment, each noise range has a size that is one-fourth of the variance of the noise. There is a corresponding bin for each noise range. It will be appreciated that a variance of the noise can be calculated for any type of noise, including noise that is not Gaussian noise.

For each transmitting antenna, partial distances are calculated from the received signal. Each partial distance for a particular transmitting antenna specifies a likelihood that the particular transmitting antenna transmitted a corresponding symbol. The partial distance for each symbol is mapped to the bin with the range that includes the partial distance. The binning of the partial distances for the particular transmitting antenna provides a histogram of the partial distances and their corresponding symbols. When the ranges of the bins are selected based on the received noise, the bins at the low end of the distribution include the smaller partial distances for the symbols more likely to have actually been transmitted and also more likely to have a higher SNR.

At step 108, the partial distance of a root node is initialized to a zero value, and a candidate list is initialized to the root node. A current transmitting antenna is set to an initial transmitting antenna in an ordering of the transmitting antennas.

Decision 110 checks whether the candidate list includes more nodes. If there are more nodes in the candidate list, process 100 proceeds to decision 112; otherwise, process 100 proceeds to decision 114. Decision 112 checks whether the constellation includes additional symbols that could be the symbol transmitted by the current transmitting antenna. If there is another symbol in the constellation for the current candidate from the list, process 100 proceeds to step 116; otherwise, process 100 returns to decision 110 to process the next candidate in the list. In one embodiment, a search graph includes a corresponding node for each pairing of the current candidate selected at decision 110 and the current symbol selected at decision 112.

At step 116, a partial distance is determined for a new node that pairs the current candidate with the current symbol. The partial distance provides a relative likelihood that the current transmitter transmitted the current symbol, while presuming the appropriate antennas transmitted the symbols of the current candidate. The partial distance of the new node is a sum of the partial distance of the current candidate and a partial distance of the current symbol. The partial distance of the current symbol is calculated from the signals received at the receiving antennas, the triangular decomposition of the channel matrix, and the symbols along the path from the root node to the new node.

At step 118, the new node is added to the bin with the range that includes the partial distance of the new node.

Decision 114 checks whether the current transmitter is the last transmitter. If there are more transmitters, process 100 proceeds to step 120; otherwise, process 100 proceeds to step 122.

At step 120, process 100 creates a new candidate list for the next transmitting antenna in the ordering of transmitting antennas. The new candidate list includes a predetermined number of the new nodes from the bins. In one embodiment, the predetermined number is the number of new nodes included during each iteration of step 120. The new candidate list includes nodes selected from the bins at the low end of the distribution.

In one embodiment, a scan searches the bins from the low end to the high end of the distribution. Any nodes in the current bin of the scan are added to the new candidate list. If the number of nodes in the current bin includes more nodes than needed to increase the new candidate list to the predetermined number of candidates, then a subset of the nodes in the current bin is arbitrarily, systematically, or randomly selected to complete the new candidate list. If the number of nodes in the current bin includes fewer nodes than needed to increase the new candidate list to the predetermined number of candidates, then all of the nodes in the current bin are added to the new candidate list. Once the new candidate list is complete, the scan can be terminated, or the scan can be allowed to continue through the remaining bins.

At step 122, a final candidate is selected that is the pairing having the smallest partial distance. The final candidate provides the detected symbols as the symbols recursively included in the final candidate along the path from the root node to the final candidate node. These symbols are detected as transmitted from the transmitting antennas at step 124. The detected symbols are output at step 126.

In another embodiment, instead of using bins for an initial transmitting antenna in the ordering of the transmitting antennas, the partial distances for the initial transmitting antenna are sorted in an order. Candidates are selected from a beginning of the order. For the non-initial transmitting antennas, candidates are selected using bins as discussed above.

Figure 2:
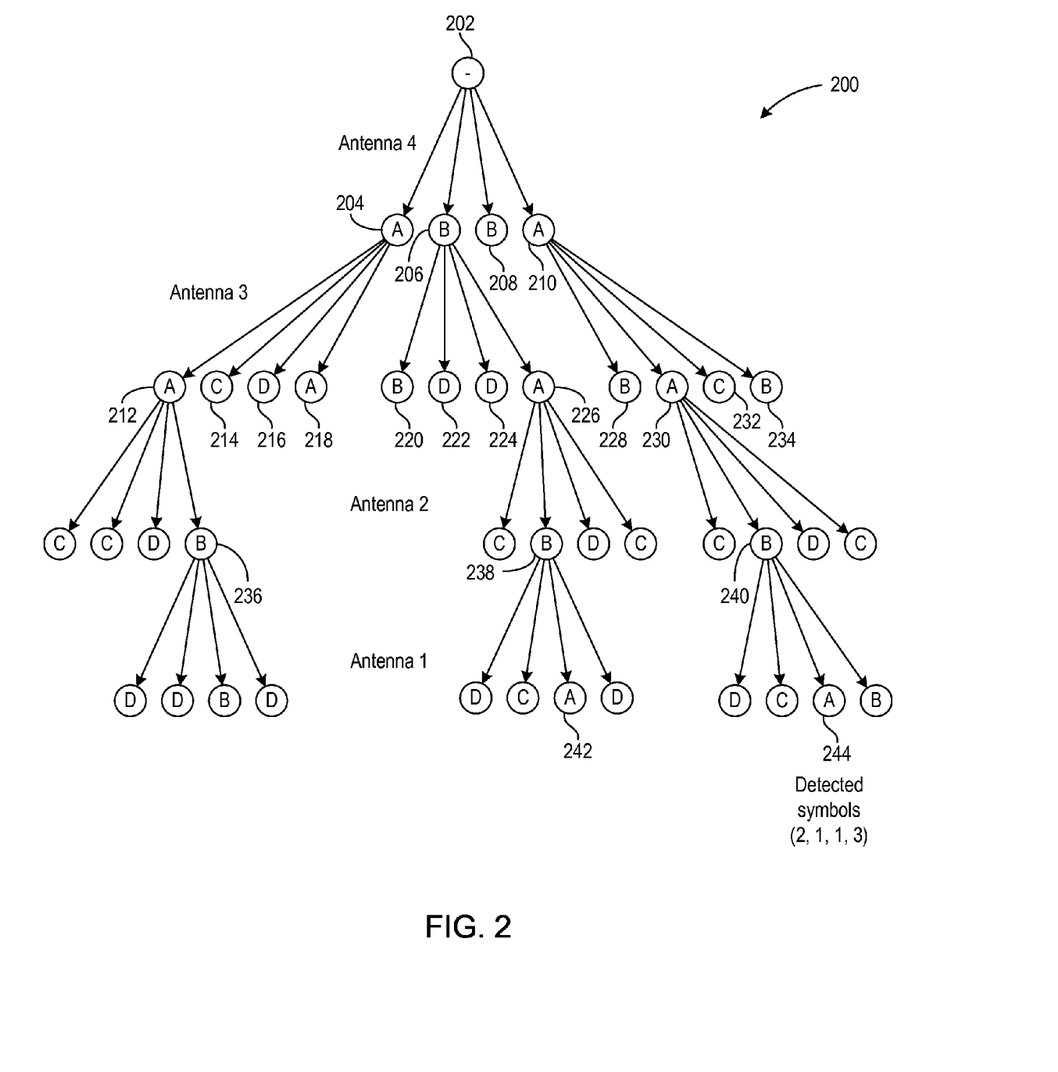
FIG. 2 is a graph diagram of an example tree illustrating a process of selecting candidates for detecting symbols communicated between multiple transmitting and receiving antennas in accordance with various embodiments of the invention.

FIG. 2 is a graph diagram of an example tree 200 illustrating a process of selecting candidates for detecting symbols communicated between multiple transmitting and receiving antennas in accordance with various embodiments of the invention. Each node except root node 202 is labeled with a bin identifier. This example is for a quadrature modulation constellation with four symbols. It will be appreciated that a constellation could have more symbols by using quadrature amplitude modulation (QAM), for example.

The search generating example tree 200 begins at root node 202 for a null candidate. Antenna four could transmit any of the four symbols in the constellation, and nodes 204, 206, 208, and 210 are pairings of a root node 202 and with respective symbols in the constellation. Thus, pairing node 204 corresponds to the pairing of root node 202 with symbol 0 in the constellation, and nodes 206, 208, and 210 respectively correspond to the pairings of root node 202 with symbols 1, 2, and 3 in the constellation.

For each of the pairing nodes 204, 206, 208, and 210, a corresponding partial distance is calculated that provides a likelihood that antenna four actually transmitted the corresponding symbol. Based on the values of the partial distances, the nodes 204, 206, 208, and 210 are assigned to bins as labeled in FIG. 2. Each bin corresponds to a range of partial distances, and in one embodiment, the ranges of the bins are generated from the received noise or a signal-to-noise ratio of the received signal. Bin A corresponds to a range of partial distances indicating a high probability that the antenna actually transmitted the corresponding symbol. Bins B, C, and D, correspond to successively lower probabilities and successively larger values of the partial distances. Pairing node 204 is assigned to bin A, and nodes 206, 208, and 210 are respectively assigned to bins B, B, and A. It will be appreciated that the ranges of the bins and the number of bins may be the same or different for each of the transmitting antennas.

For this example, three candidates are selected from the pairing nodes 204, 206, 208, and 210. The candidates are selected from the bins beginning with the bin A at the highest likelihood. Because bin A contains two pairing nodes 204 and 210, these nodes are selected as candidates for antenna four. The last of the three candidates is selected by examining bin B for the next lower likelihood. Bin B includes two nodes 206 and 208, which is more nodes than needed, and node 206 is arbitrarily, systematically, or randomly selected from bin B to complete a list of candidate nodes 204, 206, and 210.

The search continues at antenna three by expanding the selected candidate nodes 204, 206, and 210. The candidates nodes 204, 206, and 210 are expanded by generating nodes 212, 214, 216, and 218 pairing candidate node 204 with the symbols in the constellation, generating nodes 220, 222, 224, and 226 pairing candidate node 206 with the symbols in the constellation, and generating nodes 228, 230, 232, and 234 pairing candidate node 210 with the symbols in the constellation. A partial distance is calculated for each pairing node 212 through 234, and each pairing node 212 through 234 is assigned to the bin with the range that includes the calculated partial distance.

Candidates for antenna two are selected from the pairing nodes 212 through 234 for antenna three. In this example, bin A includes four nodes 212, 218, 226, and 230. Because bin A includes more than the three needed candidates, the three candidate nodes 212, 226, and 230 are arbitrarily, systematically, or randomly selected from bin A. These candidate nodes 212, 226, and 230 are similarly expanded.

The selected candidates for antenna one are the three nodes 236, 238, and 240 in bin B, because bin A does not include any nodes. For the last antenna, bin A includes pairing nodes 242 and 244, and a final candidate is selected as the node 244 from bin A having the smallest partial distance. The path from the final candidate node 244 to the root node 202 provides the detected symbols, including antenna one transmitting symbol 2, antenna two transmitting symbol 1, antenna three transmitting symbol 1, and antenna four transmitting symbol 3. It will be appreciated that the final candidate node 244 can be determined by directly comparing the partial distances of the bottom level of pairing nodes without first assigning these pairing nodes to bins.

Figure 3:
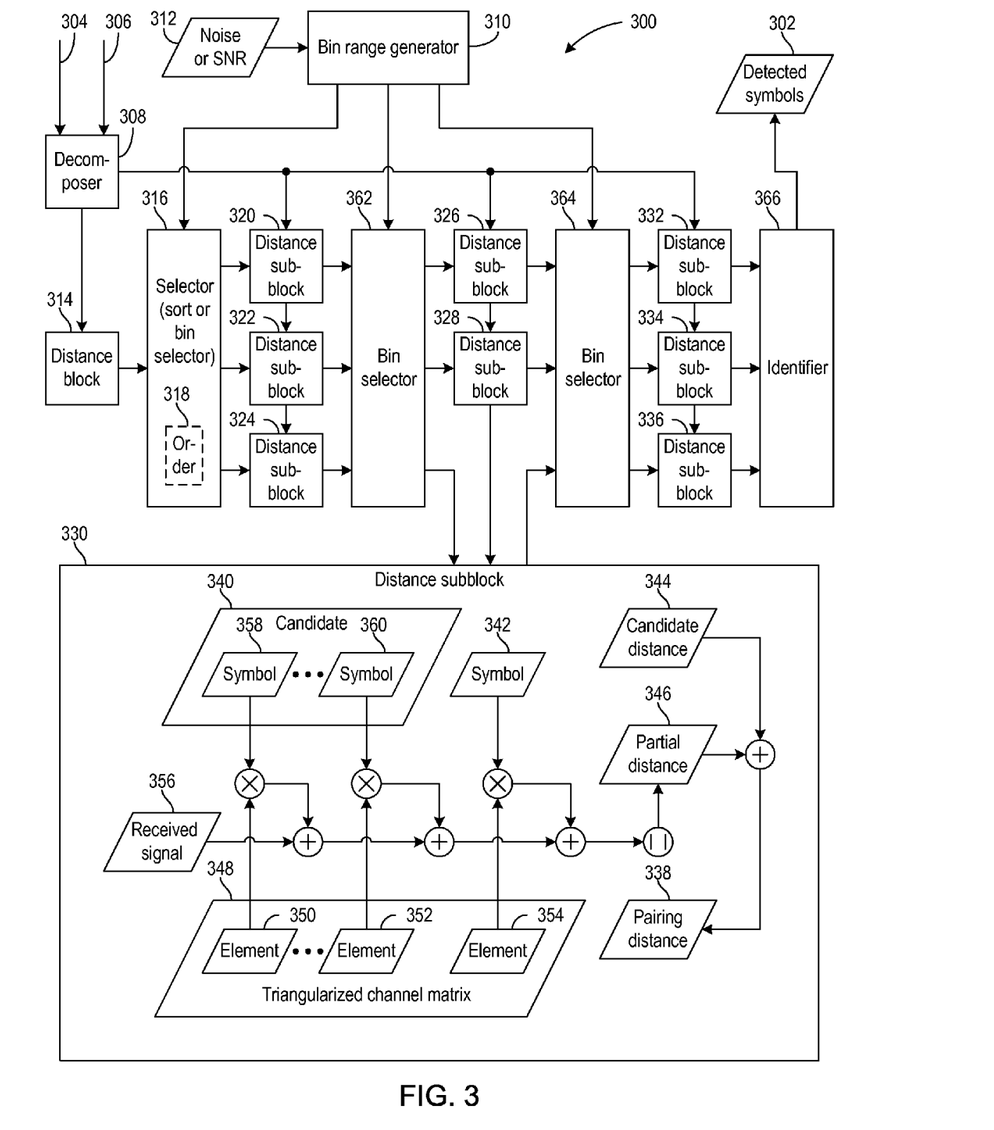
FIG. 3 is a block diagram of a circuit for detection of symbols communicated from multiple transmitting antennas to multiple receiving antennas in accordance with various embodiments of the invention.

FIG. 3 is a block diagram of a circuit 300 for detection of symbols communicated from multiple transmitting antennas to multiple receiving antennas in accordance with various embodiments of the invention. Circuit 300 produces detected symbols 302 from the channel matrix on line 304 and the received signals on line 306.

Decomposer 308 transforms the channel matrix on line 304 into a triangular matrix using a QR decomposition, for example. Decomposer 308 also transforms the received signals on line 306 according to the decomposition of the channel matrix on line 304.

Bin range generator 310 generates a series of ranges of partial distances. In one embodiment, bin range generator 310 generates the bin ranges from noise 312 or a signal-to-noise ratio of the received signals on line 306. In one example, each bin range has a size given by one-fourth of the variance of the noise 312. The least significant range from a value of zero to the value of one-fourth of the variance of the noise 312 corresponds to a high likelihood that the transmitting antenna transmitted the corresponding symbol and corresponds to a small amount of noise 312 in the received signals on line 306 too. The other ranges correspond to lesser likelihoods of transmitting the corresponding symbol and/or more noise 312.

Distance block 314 determines partial distances for an initial transmitting antenna transmitting each symbol in a constellation. For this initial transmitting antenna, the partial distances give a relative likelihood of the initial transmitting antenna transmitting each of the symbols in the constellation. For an example of a constellation that has an order of w symbols, distance block 314 provides the w partial distances to selector 316. In one embodiment, distance block 314 determines a partial distance for each pairing of a null candidate and each symbol in a constellation.

Selector 316 selects candidates that have smaller values of the partial distance. In one embodiment, selector 316 assigns the partial distances from distance block 314 to bins with ranges from generator 310, and selects the candidates from the bins for smaller values of the partial distances. In another embodiment, selector 316 optionally sorts the partial distances in ascending order 318 and selects a predetermined number of the candidates from the beginning of the ascending order 318. The selected candidates are sent to respective distance sub-blocks 320, 322, and 324.

Collectively, distance sub-blocks 320, 322, and 324 form a distance block for a second transmitting antenna. Each distance sub-block 320, 322, or 324 includes a function similar to distance block 314. For example, distance sub-block 320 determines partial distances for the second transmitting antenna transmitting each of the symbols in the constellation along with the first transmitting antenna transmitting the candidate symbol selected by selector 316 for distance sub-block 320. Distance sub-block 320 calculates the partial distance for each symbol in the constellation as the sum of the partial distance of the candidate from selector 316 and a partial distance for the second transmitting antenna transmitting the symbol.

Similarly, distance sub-blocks 326, 328, and 330 collectively form a distance block for a third transmitting antenna, and distance sub-blocks 332, 334, and 336 collectively form a distance block for a fourth transmitting antenna. Each distance sub-block 326, 328, 330, 332, 334, or 336 adds symbols transmitted from a corresponding antenna to an input candidate.

Distance sub-block 330 determines a partial distance 338 for the pairing of a candidate 340 and each possible symbol 342 in a constellation. For clarity, FIG. 3 shows the calculation of the pairing distance 338 for only one symbol 342 in the constellation. The partial distance 338 for the pairing is a sum of a previously determined partial distance 344 for the candidate 340 and a partial distance 346 for the pairing of the candidate 340 and the symbol 342.

The channel matrix on line 304 is transformed into a triangular matrix 348 with a row of elements 350 through 352, 354 for the transmitting antenna that corresponds to the distance sub-block 330. During the transformation of the channel matrix into a triangular matrix, the received signals on line 306 are correspondingly transformed into the received signal 356. The partial distance 346 is a norm of a sum of the transformed received signal 356 and a weighted sum of the symbols 358 through 360 and 342. The symbols 358 through 360 from candidate 340 and the symbol 342 from the constellation have weights given by the row of elements 350 through 352 and 354 in the triangular matrix 348.

Bin selector 362 assigns the partial distances of the pairings from distance sub-blocks 320, 322, and 324 to bins, and selects candidates for distance sub-blocks 326, 328, and 330 from the bins. Bin selector 364 similarly selects candidates for the identifier block 366.

Identifier block 366 selects the final candidate having the smallest distance norm among the pairings from distance sub-blocks 332, 334, and 336. The final candidate corresponds to the selection of a corresponding symbol for each transmitting antenna and these symbols for the transmitting antennas are the detected symbols 302.

Figure 4:
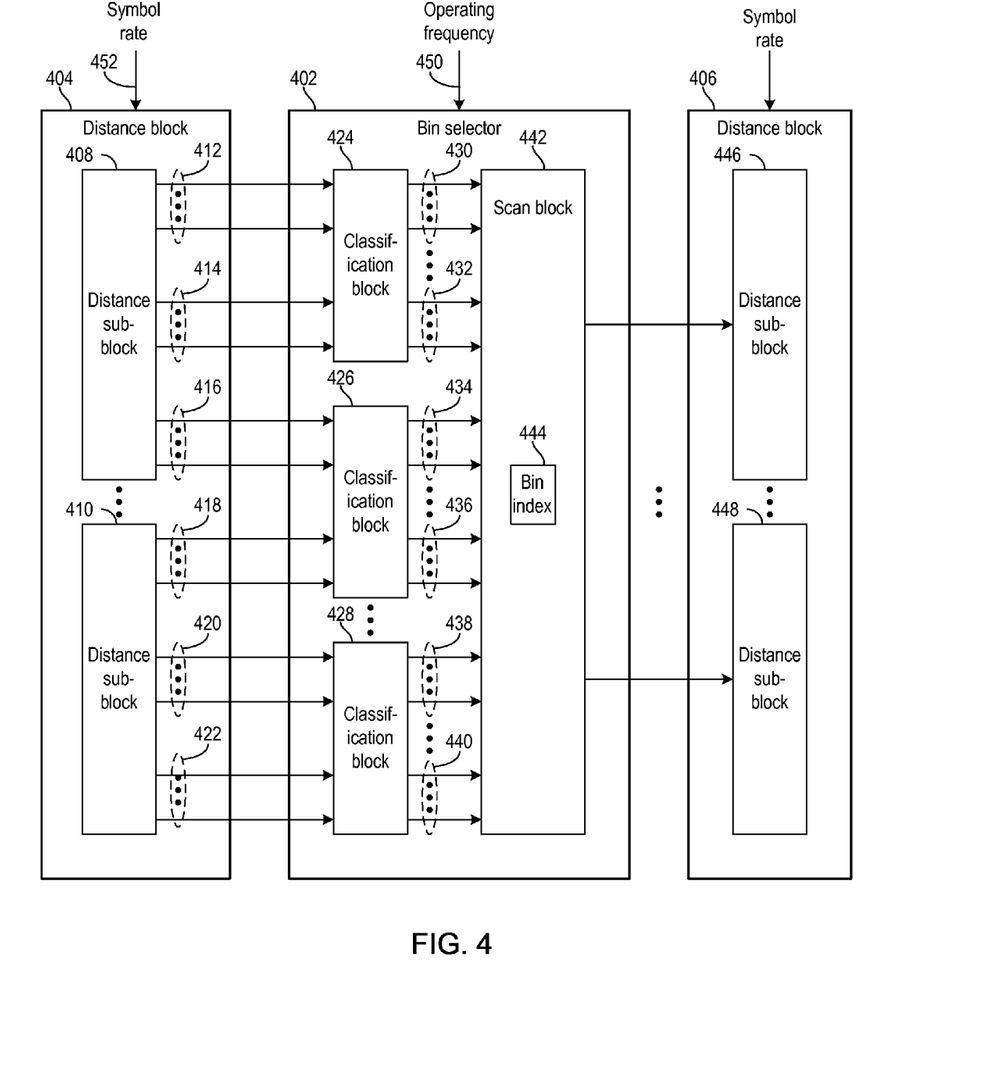
FIG. 4 is a block diagram of a circuit for selection of candidates in accordance with various embodiments of the invention.

FIG. 4 is a block diagram of a circuit for selection of candidates in accordance with various embodiments of the invention. A bin selector 402 receives pairings from a first distance block 404 for a first transmitting antenna and selects candidates from the received pairings. Bin selector 402 sends the selected candidates to a second distance block 406 for a second transmitting antenna. The first and second transmitting antennas are successive transmitting antennas in an ordering of the transmitting antennas.

Distance block 404 includes distance sub-blocks 408 through 410. Each of distance sub-blocks 408 through 410 calculates a partial distance for each pairing of a candidate with the symbols in a constellation. Distance sub-block 408 generates groups of the pairings on lines 412, 414, and 416, and distance sub-block 410 generates groups of the pairings on lines 418, 420, and 422.

Bin selector 402 includes classification blocks 424, 426, and 428. Classification block 424 receives the pairings on lines 412 and 414 from distance sub-block 408, classification block 426 receives the pairings on lines 416 from distance sub-block 408 and the pairings on lines 418 from distance sub-block 410, and classification block 428 receives the pairings on lines 420 and 422 from distance sub-block 410. Classification block 424 classifies the pairing from lines 412 and 414 into bins on lines 430 through 432. Classification blocks 426 and 428 similarly classify the pairings on lines 416, 418, 420, and 422 into the bins on lines 434, 436, 438, and 440. The bins on lines 430, 434, and 438 correspond to a range including small values of the partial distances and the bins on lines 432, 436, 440 correspond to a range including larger values of the partial distances.

Scan block 442 selects a predetermined number of candidates from the pairings in the bins on lines 430, 434, 438, 432, 436, and 440. Scan block 442 selects a respective candidate for each of the distance sub-blocks 446 through 448 in distance block 406.

In one embodiment, scan block 442 includes a register 444 storing a current bin index. During a first time step for the initial value of the bin index in register 444, the scan block 442 checks the bins on lines 430, 434, and 438 for the pairings having a small value of the partial distances. Scan block 442 selects candidates from any pairings in the bins on lines 430, 434, and 438. If there are more pairings available in the bins on lines 430, 434, and 438 than the needed number of candidates, scan block 442 randomly retrieves the candidates from these bins. If there are fewer available pairings than needed in these bins, scan block 442 retrieves all of the pairings in these bins and increments the bin index in register 444. During a second time step for the incremented value of the bin index in register 444, the scan block 442 checks the bins on lines 432, 436, and 440 for the pairings having the next larger range of the partial distances. In subsequent time steps, scan block 442 continues incrementing the bin index in register 444 and examining corresponding bins until scan block 442 has selected the predetermined number of candidates.

In one embodiment, each of these time steps corresponds to a cycle of an operating clock on line 450. The distance sub-blocks 408 through 410 generate new groups of pairings on lines 412, 414, 416, 418, 420, and 422 during each cycle of a symbol clock on line 452, because each transmitting antenna transmits a symbol during a corresponding time interval. There are multiple cycles of the operating clock on line 450 for each cycle of the symbol clock on line 452 when the frequency of the operating clock on line 450 is a multiple of the frequency of the symbol clock on line 452. The scan block 442 can complete the scan using multiple cycles of the operating clock on line 450 before receiving the next set of pairings during the next cycle of the symbol clock on line 452. In this embodiment, the number of bin ranges is less than the ratio of the frequencies of the clocks on lines 450 and 452, such that the scan block 442 can process the bins at a rate of one bin per cycle of the operating clock on line 450.

Figure 5:
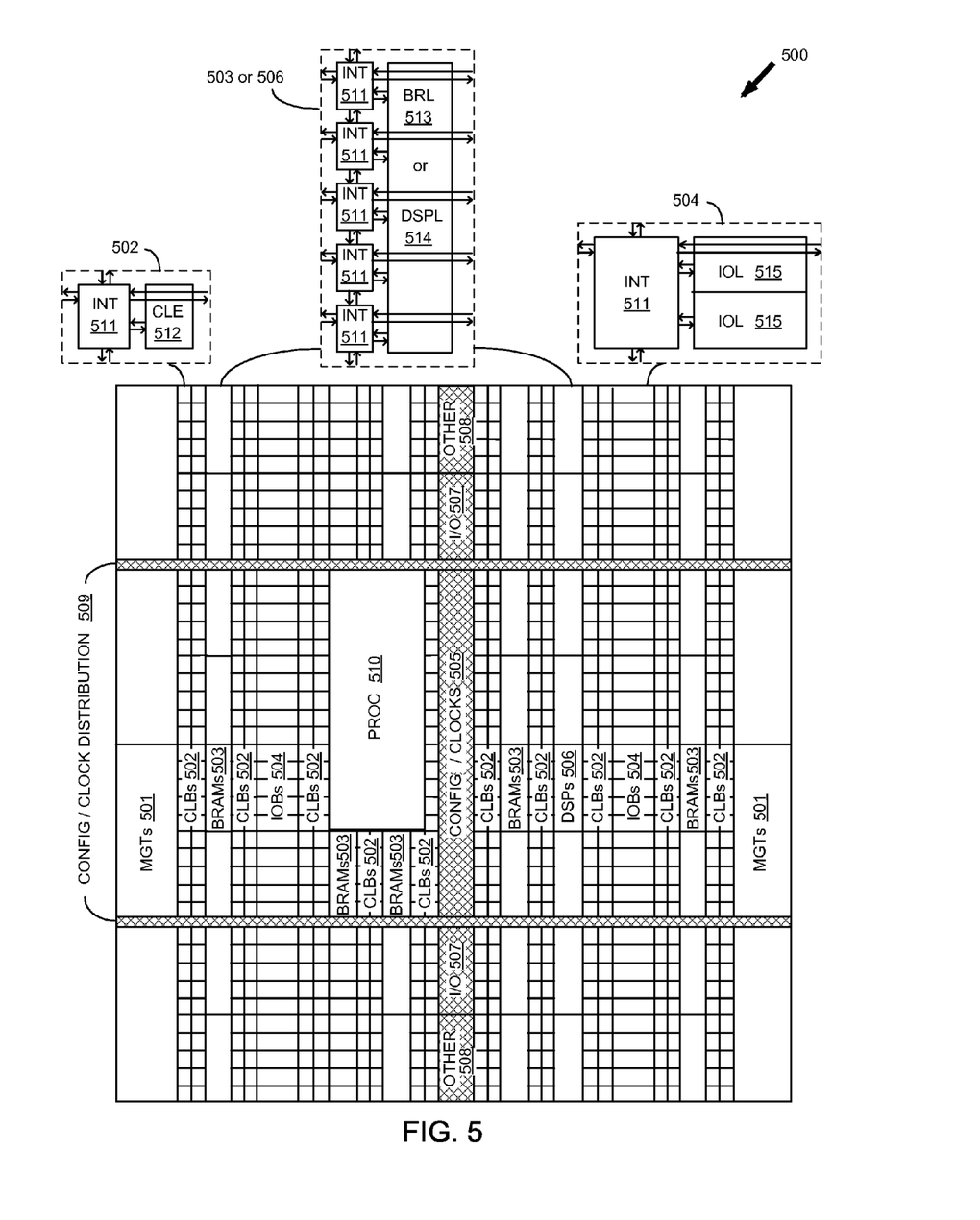
FIG. 5 is a block diagram of a programmable integrated circuit for implementing symbol detection in accordance with one or more embodiments of the invention.

FIG. 5 is a block diagram of a programmable integrated circuit for implementing symbol detection in accordance with one or more embodiments of the invention. The exemplary illustrated circuit is a programmable logic device (PLD), specifically a Field Programmable Gate Array (FPGA). It will be clear to those of skill in the art, however, that the methods of the invention can be practiced using other types of integrated circuits and/or systems. For example, some embodiments of the invention may utilize Application Specific Integrated Circuits (ASICs), non-programmable integrated circuits, partially programmable integrated circuits, and/or electronic systems other than integrated circuits. It will be clear to those of skill in the art that the invention can be implemented within these and other architectural variations.

Advanced programmable logic devices can include several different types of programmable logic blocks in the array. For example, FIG. 5 illustrates an FPGA architecture 500 that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 6:
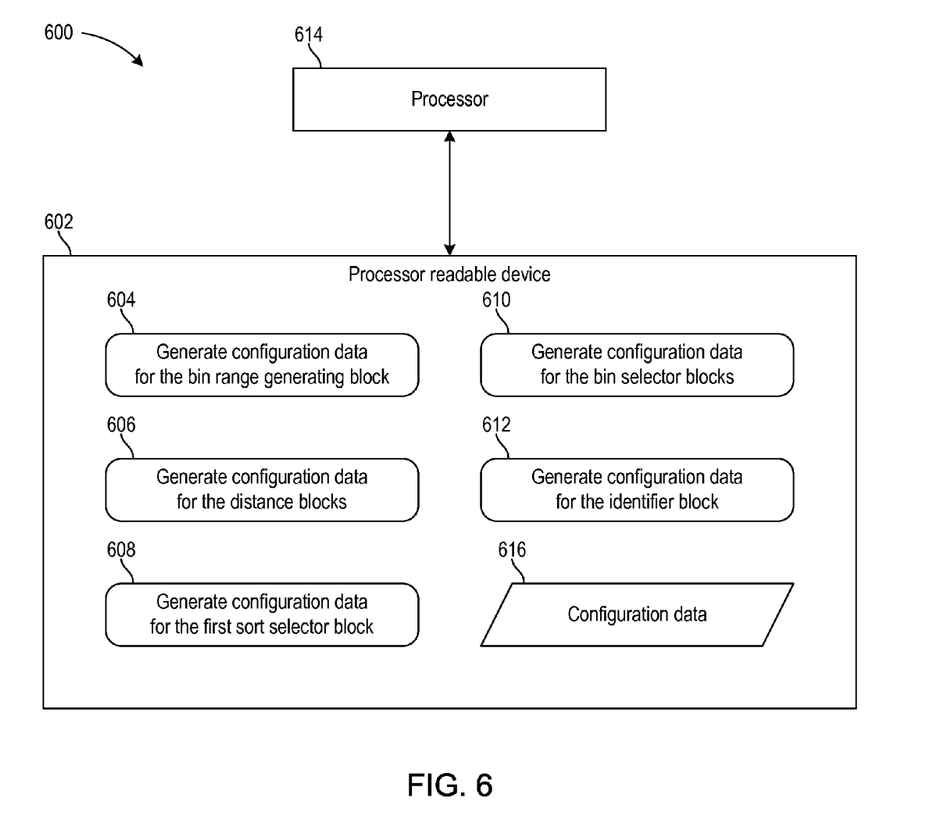
FIG. 6 is a block diagram of a system for generating configuration data for implementing symbol detection in a programmable integrated circuit in accordance with one or more embodiments of the invention.

FIG. 6 is a block diagram of a system for generating configuration data for implementing symbol detection in a programmable integrated circuit in accordance with one or more embodiments of the invention. Processor-readable device 602 is configured with software modules 604, 606, 608, 610, and 612. Execution of the instructions of software modules 604, 606, 608, 610, and 612 by processor 614 causes processor 614 to generate configuration data that implements MIMO symbol detection in a programmable integrated circuit. In one embodiment, the generated configuration data 616 is stored on the processor readable device 602.

Execution of the instructions of software module 604 causes processor 614 to generate configuration data for a bin range generator. Execution of the instructions of software module 606 causes processor 614 to generate configuration data for the distance blocks. Execution of the instructions of software module 608 optionally causes processor 614 to generate configuration data for a sorting selector block for the initial transmitting antenna. Execution of the instructions of software module 610 causes processor 614 to generate configuration data for a bin selector blocks for all of the transmitting antennas or all but the initial transmitting antenna. Execution of the instructions of software module 612 causes processor 614 to generate configuration data for the identifier block.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for detecting symbols transmitted from multiple transmitting antennas and received at multiple receiving antennas. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit for detecting a plurality of symbols transmitted from multiple transmitting antennas to multiple receiving antennas, wherein the transmitting antennas include at least a first and a second transmitting antenna, the circuit comprising:

a plurality of respective distance-blocks corresponding to the transmitting antennas, each including at least one sub-block, each sub-block receiving an input candidate for the corresponding transmitting antenna, wherein the sub-block determines partial distances of pairings of the candidate and one of a plurality of symbols in a constellation, and the sub-block determines the partial distance of each pairing from a partial distance of the candidate and a plurality of signals received at the receiving antennas;

at least one respective selector corresponding to all but the second transmitting antenna, wherein each respective selector uses a plurality of bins having respective ranges of values of the partial distances, the respective selector assigns each pairing for each candidate of the transmitting antenna that corresponds to the respective selector to the bin having the respective range that includes the partial distance of the pairing, and the respective selector selects each candidate from one or more of the bins having ranges that are smallest of the ranges of all the bins; and an identifier block corresponding to the second transmitting antenna, the identifier block coupled to the respective distance-block corresponding to the second transmitting antenna for receiving the pairings for each candidate for the second transmitting antenna, wherein the identifier block selects as a final candidate, one of the pairings having the smallest partial distance.

2. The circuit of claim 1, further comprising a generator coupled to the at least one respective selector, wherein the generator generates the respective ranges of the bins in response to a signal-to-noise ratio of the signals received at the receiving antennas.

3. The circuit of claim 1, further comprising a generator coupled to the at least one respective selector, wherein the generator sets a size of the respective ranges of the bins to one-fourth of a variance of noise associated with the signals received at the receiving antennas.

4. The circuit of claim 1, wherein the at least one sub-block of the respective distance-block corresponding to the first transmitting antenna is a single sub-block that inputs a single candidate for the first transmitting antenna, and the single candidate for the first transmitting antenna is a null candidate.

5. The circuit of claim 1, wherein each of the respective distance-blocks corresponding to the transmitting antennas other than the first transmitting antenna include an equal number of the at least one sub-block.

6. The circuit of claim 1, wherein each sub-block of the respective distance-blocks determines the partial distance for each of the pairings of a candidate and a symbol in the constellation as a sum of the partial distance of the candidate and a partial distance for the symbol.

7. The circuit of claim 1, wherein each sub-block of the respective distance-blocks determines the partial distance for each of the pairings of a candidate and a symbol in the constellation from a partial distance for the symbol calculated as a function of the symbol and the symbols recursively included in the candidate.

8. The circuit of claim 1, wherein each sub-block of the respective distance-blocks determines the partial distance for each of the pairings of a candidate and a symbol in the constellation from a partial distance for the symbol calculated as a function of a triangular matrix generated from a channel matrix of the transmitting and receiving antennas.

9. The circuit of claim 1, wherein:

the respective selector corresponding to the first transmitting antenna is the respective selector that sorts the pairings for each candidate for the first transmitting antenna in an order according to the partial distances of the pairings; and the respective selector selects a predetermined number of candidates for the another one of the transmitting antennas, the candidates being the pairings from a beginning of the order.

10. The circuit of claim 1, wherein:

the respective selector includes a plurality of classification blocks that collectively receive the pairings for each candidate for the first transmitting antenna that corresponds to the respective selector;

each classification block receives a respective portion of the pairings and assigns each pairing of the respective portion to the bin having the respective range that includes the partial distance of the pairing; and the respective selector further includes a scan block that scans through the bins in an order from smallest to largest of the respective ranges and retrieves each candidate from each of the bins in the order until a predetermined number of plurality of candidates is retrieved.

11. The circuit of claim 1, wherein:

the respective selector includes a plurality of classification blocks that collectively receive the pairings for each candidate for the first transmitting antenna that corresponds to the respective selector;

each classification block processes a respective portion of the pairings during each of a plurality of time steps;

the processing during each time step includes assigning each pairing of the respective portion to the bin having the respective range that includes the partial distance of the pairing; and the respective selector also includes a scan block that scans through the bins in an order from smallest to largest of the respective ranges and retrieves each candidate from each of the bins in the order until a predetermined number of plurality of candidates is retrieved.

12. The circuit of claim 11, wherein a number of the time steps is given by an integer that is at least the ratio of an operating frequency of the circuit over a rate of transmitting symbols in the constellation from the transmitting antennas.

13. The circuit of claim 1, wherein:

the respective selector selects each candidate as a pairing from the bins having the respective ranges that are smallest; and the identifier block selects the final candidate to be one of the pairings having the partial distance that is smallest.

14. The circuit of claim 1, wherein:

the identifier block selects the final candidate that recursively includes a respective symbol for each transmitting antenna; and the respective symbol in the constellation is detected as transmitted from the transmitting antenna.

15. A program storage medium, comprising:

a non-transitory processor-readable device configured with instructions, wherein execution of the instructions by one or more processors causes the one or more processors to perform operations including generating configuration data for a programmable integrated circuit for detecting a plurality of symbols transmitted from multiple transmitting antennas to multiple receiving antennas, wherein the transmitting antennas include at least a first and a second transmitting antenna, the circuit including:

a plurality of respective distance-blocks corresponding to the transmitting antennas, each including at least one sub-block, each sub-block receiving an input candidate for the corresponding transmitting antenna, wherein the sub-block determines partial distances of pairings of the candidate and one of a plurality of symbols in a constellation, and the sub-block determines the partial distance of each pairing from a partial distance of the candidate and a plurality of signals received at the receiving antennas;

at least one respective selector corresponding to all but the second transmitting antenna, wherein each respective selector uses a plurality of bins having respective ranges of values of the partial distances, the respective selector assigns each pairing for each candidate of the transmitting antenna that corresponds to the respective selector to the bin having the respective range that includes the partial distance of the pairing, and the respective selector selects each candidate from one or more of the bins having ranges that are smallest of the ranges of all the bins; and an identifier block corresponding to the second transmitting antenna, the identifier block coupled to the respective distance-block corresponding to the second transmitting antenna for receiving the pairings for each candidate for the second transmitting antenna, wherein the identifier block selects as a final candidate, one of the pairings having the smallest partial distance.

16. The program storage medium of claim 15, wherein:
the respective selector includes a plurality of classification blocks that collectively receive the pairings for each candidate for the transmitting antenna that corresponds to the respective selector;
each classification block receives a respective portion of the pairings and assigns each pairing of the respective portion to the bin having the respective range that includes the partial distance of the pairing; and
the respective selector further includes a scan block that scans through the bins in an order from smallest to largest of the respective ranges and retrieves each candidate from each of the bins in the order until a predetermined number of plurality of candidates is retrieved.

17. The program storage medium of claim 16, wherein:
each classification block receives a subset of the respective portion of the pairings over each of a plurality of time steps and for each time step assigns each pairing of the subset to the bin having the respective range that includes the partial distance of the pairing; and
a number of the time steps is given by an integer that is at least the ratio of an operating frequency of the circuit over a rate of transmitting symbols in the constellation from the transmitting antennas.

18. The program storage medium of claim 15, wherein the identifier block selects the final candidate that recursively includes a respective symbol for each transmitting antenna, and the respective symbol in the constellation is detected as transmitted from the transmitting antenna.

19. A system for detecting symbols communicated between multiple transmitting antennas and multiple receiving antennas, comprising:
means for generating respective ranges for a plurality of bins in response to a signal-to-noise ratio of a plurality of signals received at the receiving antennas;
for each transmitting antenna, means for determining partial distances of a plurality of pairings of each of at least one candidate for the transmitting antenna and one of a plurality of symbols in a constellation from a partial distance of the candidate and the signals received at the receiving antennas;
for each of a plurality of combinations of a first and successive second transmitting antennas, means, coupled to the means for generating and to the means for determining, for assigning each pairing for each candidate for the first transmitting antenna of the combination to the bin having the respective range that includes the partial distance of the pairing, and a first means, coupled to the means for assigning, for selecting each candidate for the successive second transmitting antenna of the combination as a pairing from the bins having the respective ranges that are smaller; and
a second means, coupled to a last one of the first means for selecting, for selecting a final candidate that is one of the pairings for each candidate for a last transmitting antenna, wherein the final candidate is the one of the pairings having the partial distance that is smaller.

* * * * *